United States Patent [19]

Maeda

[11] Patent Number: 5,365,291
[45] Date of Patent: Nov. 15, 1994

[54] APPARATUS FOR ADJUSTABLY MOUNTING A CAMERA ON AIRCRAFT

[75] Inventor: Iwao Maeda, Kobe, Japan

[73] Assignee: Shinmaywa Industries, Ltd., Nishinomiya, Japan

[21] Appl. No.: 948,672

[22] Filed: Sep. 22, 1992

[30] Foreign Application Priority Data

Sep. 30, 1991 [JP] Japan .................. 3-276352

[51] Int. Cl.⁵ ............................ G03B 39/00
[52] U.S. Cl. ........................ 354/74; 354/65
[58] Field of Search ................ 354/81, 74

[56] References Cited

U.S. PATENT DOCUMENTS

| | | | |
|---|---|---|---|
| 2,630,983 | 3/1953 | Horne et al. | 354/74 |
| 3,485,151 | 12/1969 | Taylor | 354/74 |
| 3,662,661 | 5/1972 | Whitacre et al. | 354/74 |
| 3,917,199 | 11/1975 | Dewitt | 354/74 |
| 4,114,839 | 9/1978 | Sibley et al. | 354/74 |
| 4,174,162 | 11/1979 | Giacomini et al. | 354/74 |
| 5,093,677 | 3/1992 | McMahon | 354/74 |

*Primary Examiner*—Michael L. Gellner
*Assistant Examiner*—Nicholas J. Tuccillo
*Attorney, Agent, or Firm*—Eugene E. Renz, Jr.

[57] ABSTRACT

A mechanism for mounting a camera on an aircraft, such as a helicopter, comprising a camera housing for holding a camera and a camera support section including a linkage system for mounting the camera housing to the underside of the aircraft in a manner permitting movement between a retracted position proximate the aircraft fuselage and an extended position below the plane of the landing skids to facilitate 360° photography. The mechanism includes a motor driven actuator for positioning the support section between limit positions and a manual back-up system in the event that the motor driven system becomes inoperable.

11 Claims, 11 Drawing Sheets

APPARATUS FOR ADJUSTABLY MOUNTING A CAMERA ON AIRCRAFT

FIELD OF THE INVENTION

The present invention relates to improvements in apparatus for mounting cameras on aircraft such as helicopters and more specifically to an improved mounting arrangement facilitating unobstructed 360° photography with a single camera.

BACKGROUND OF THE INVENTION

Presently, cameras are mounted on a rack located on one side of the helicopter or a pair of cameras are mounted in a fixed position on both sides of the sled-type skids to enable 360° photography. This presents certain disadvantages and drawbacks. For example, a camera mounted on one side of the helicopter has a drawback that it is necessary to swing the helicopter around when desiring or attempting to photograph on the opposite side from the rack. Thus, the camera cannot perform the 360° photography while the helicopter is in a fixed position in the air.

Furthermore, it has been found that mounting on one side affects the balance of the helicopter during flight by reason of increased air resistance on the camera side and thus the speed of the helicopter is limited in the range of 160 km/h.

Cameras mounted on both sides of the skid interfere with the field of view in certain areas and thus limit the capability of omni-directional photography.

SUMMARY OF THE INVENTION

With the foregoing in mind, it is an object of the present invention to provide a camera mounting means for aircraft characterized by novel features of construction and arrangement facilitating so-called 360° photography with a single camera. To this end, camera mounting means are provided including an actuating mechanism or means for selectively positioning the camera in a retracted position nested in the underside of the aircraft fuselage above the plane of the landing skids and an extended position below the plane of the landing skids facilitating 360° photography from a single camera. Accordingly, during flight, the actuating mechanism moves the camera support downwardly to lower the camera below the plane of the landing gear skids so that the landing gear does not come into the field of view of the camera and when preparing for landing, the camera mounting apparatus raises the camera above the plane of the landing gear skids to prevent contact with the ground on landing.

Other features of the present invention include means for cleaning the camera from a remote location and manually operable actuating means for the camera in the event of failure of the automatic system and a fail-safe shear pin arrangement to release the mounting apparatus and permit displacement of the camera from its extended position upon occurrence of a predetermined vertical force to permit a safe landing in the event the mechanism for operating the camera mounting apparatus fails or the camera mounting apparatus is locked in an extended position.

BRIEF DESCRIPTION OF THE DRAWINGS

These and other objects of the present invention and the various features and details of the operation and construction thereof, are hereinafter more fully set forth with reference to the accompanying drawings, wherein.

DETAILED DESCRIPTION OF THE PREFERRED EMBODIMENT

Figure 1:
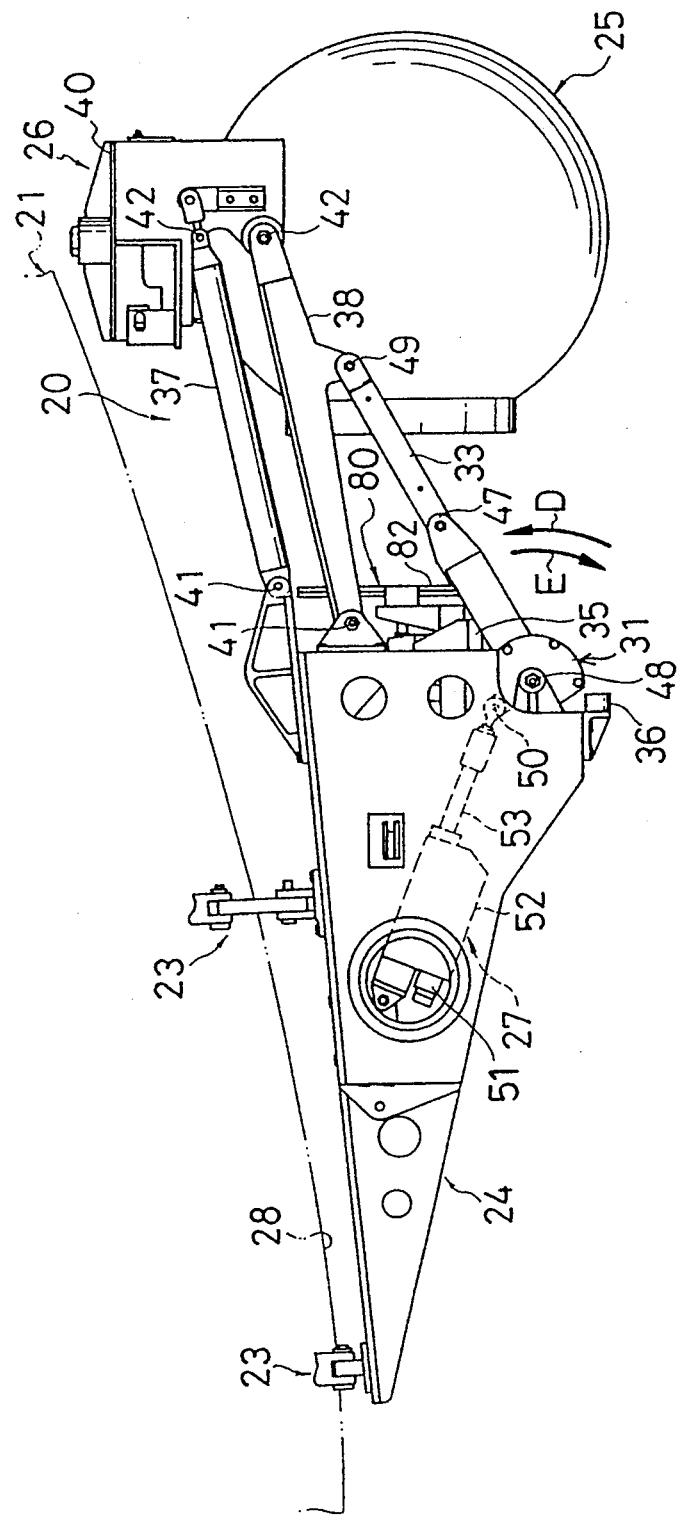
FIG. 1 is a side elevational view of a camera mounting apparatus in accordance with the present invention.

Referring now to the drawings and particularly to FIGS. 1–7 thereof, there is shown a camera mounting apparatus generally designated by the numeral 20 for movably mounting a camera on an aircraft, such as the helicopter 21. As illustrated, the camera mounting apparatus or mechanism 20 includes a rack or frame 24 suspended by fittings 23 from the fuselage of the helicopter within the landing gear skid 22 of the landing gear skid mounting section 28.

Figure 6:
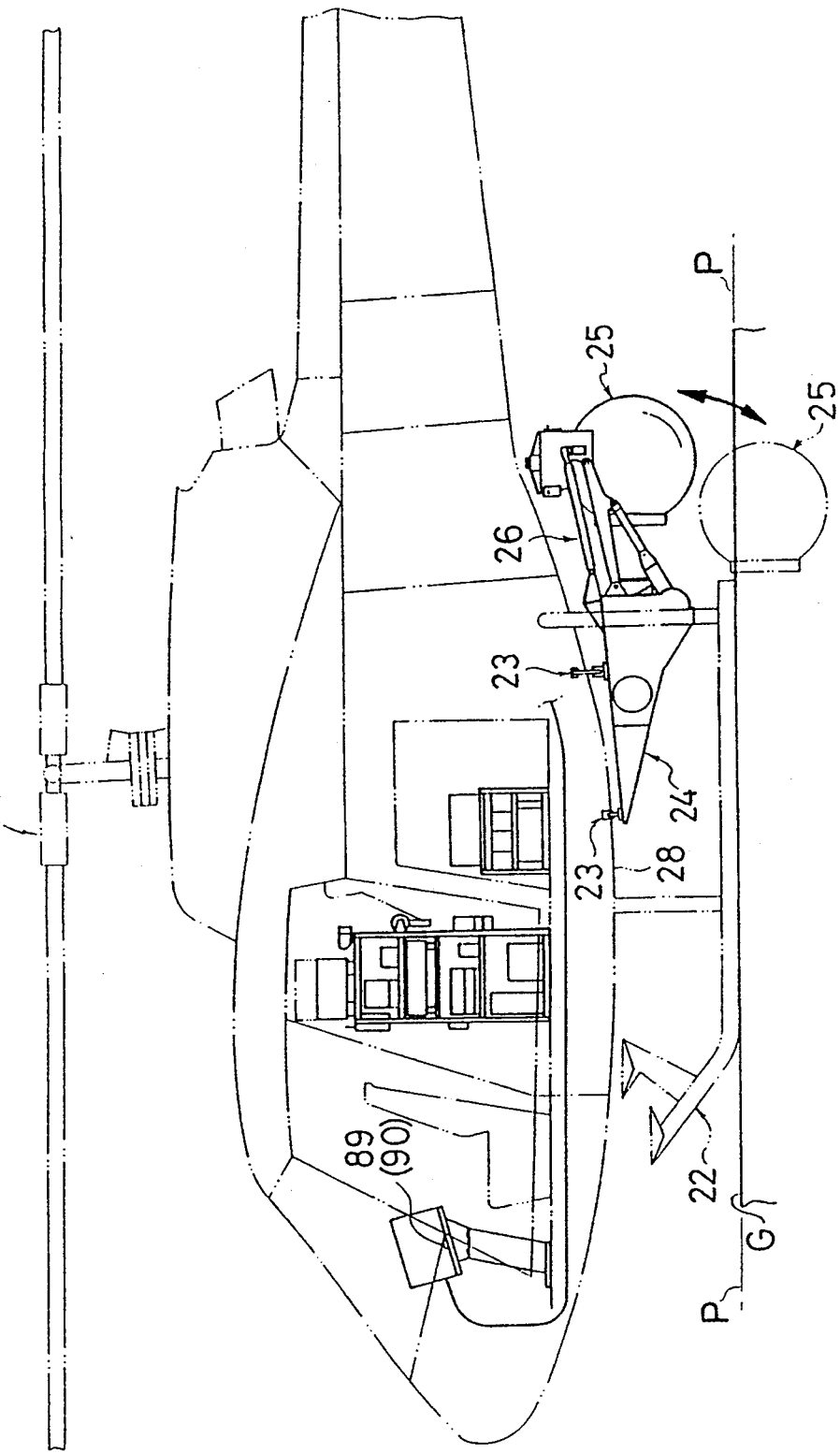
FIG. 6 is a side elevational view of a helicopter equipped with a camera mounting apparatus in accordance with the present invention.
Figure 7:
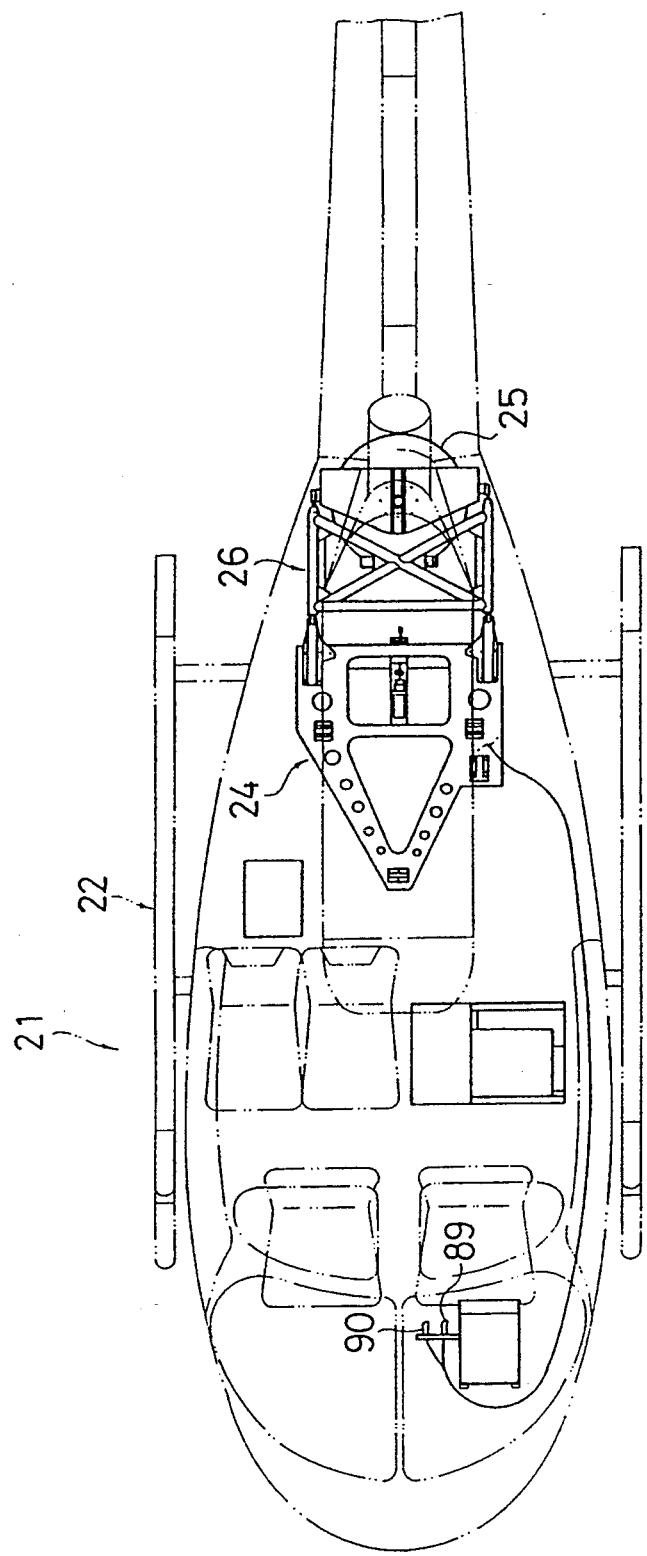
FIG. 7 is a plan view of the helicopter shown in dot and dash line overlying the mounting apparatus shown in full line.

The camera mounting mechanism 20 includes a camera support section 26 for holding a housing 25 for a camera and a motor driven actuator 27 for actuating the camera support section 26 between a retracted position nested under the aircraft above the horizontal plane P—P of the skids 22 (full line position of FIG. 6) and an extended position below the plane P—P for 360° photography capabilities for a camera in the housing 25 (broken line position in FIG. 6).

Figure 2:
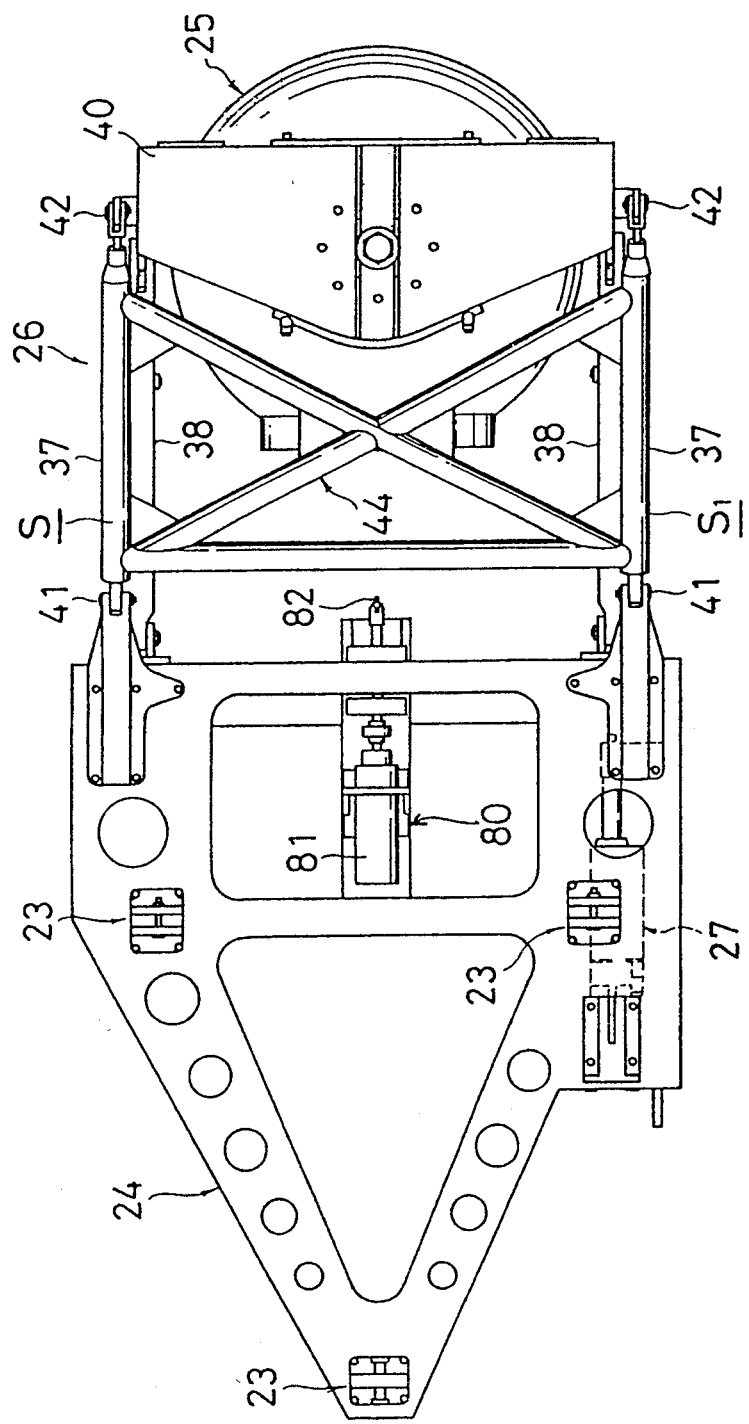
FIG. 2 is a bottom plan view of the apparatus shown in FIG. 1.
Figure 3:
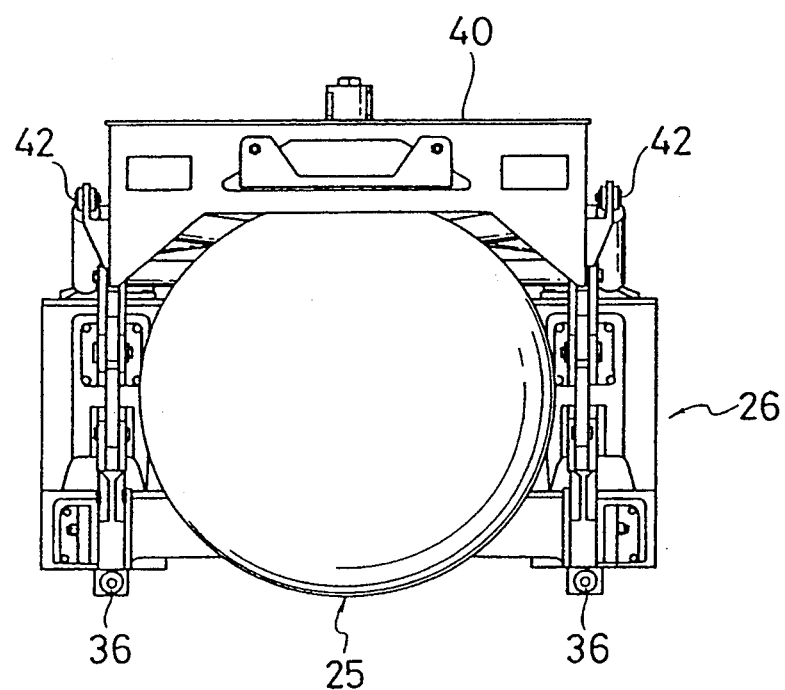
FIG. 3 is a right side view of the camera mounting apparatus of FIG. 1.
Figure 4:
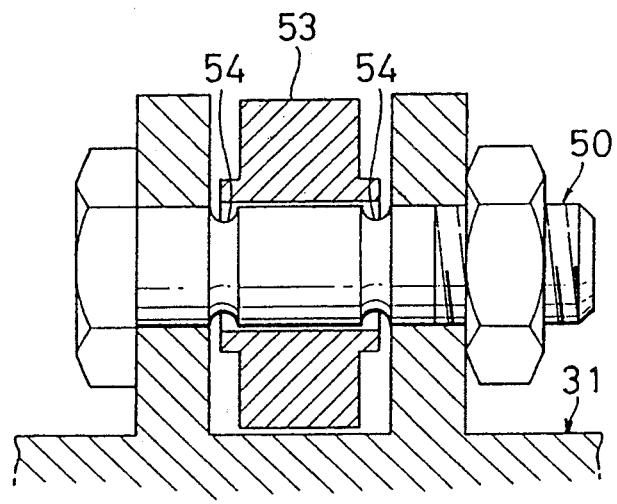
FIG. 4 is a fragmentary sectional view of a shear pin release mechanism for a camera mounting apparatus in accordance with the present invention.
Figure 5:
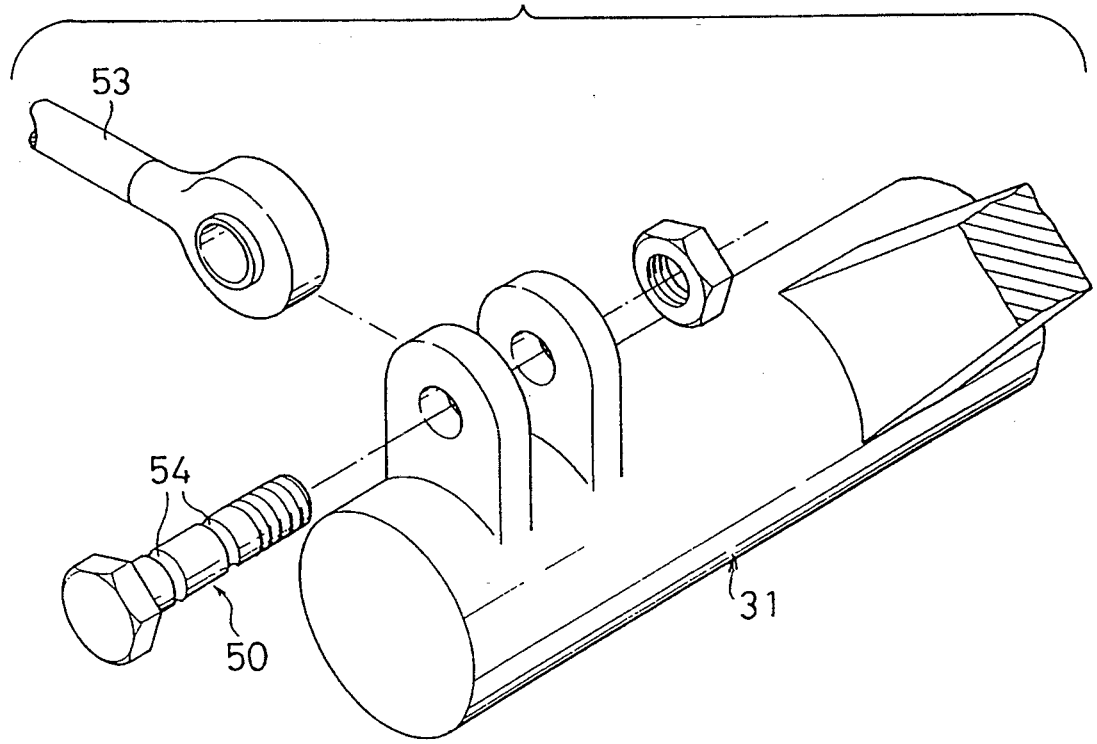
FIG. 5 is an exploded perspective view of the parts of the camera mounting and actuating mechanism of the present invention.

Considering now the details of the camera mounting mechanism of the present invention, the camera support section 26 comprises a linkage system S and S₁, on opposite sides of the rack 24 comprised of identical elements including a pair of parallel links 37 and 38, a bell crank 31, connecting link 33 and a pair of stops 35 and 36. The linkage systems S and S₁, as best illustrated in FIG. 2, are connected for integrated movement and operation by an X-shaped bracket or frame 44.

The links 37 and 38 are pivotally mounted at one end to the rack 24 and pivotally mounted at the opposite end to a bracket 40 by means of pins 41 and 42 respectively. The camera housing 25 is mounted on the bracket 40 whose direction can freely be changed. Thus, the linkage systems S and $S_1$ each comprising parallel links 37 and 38 are connected for integral displacement or movement via bracket 44 which forms a connecting link during movement between retracted and extended limit positions of the camera elevating mechanism.

The bell crank 31 is connected to the motor driven actuator 27 by means of a shear pin assembly 50. The bell crank 31 is also connected via connecting link 33 with one of the links of the linkage systems S and $S_1$, in the present instance, the link 38. Rotation of the bell crank is limited by a pair of spaced stops 35 and 36.

The motor driven actuator mechanism 27 has an operating lever 53 for moving into and out of the housing 52 by rotation of a motor 51 equipped with a reduction gear.

The shear pin or bolt 50 has a reduced cross section provided by axially spaced grooves 54, 54 formed in its outer periphery and thus has a lower shear or breaking strength than the other links of equal diameter. This provides a safety factor in the overall system for the reason that the shear bolt 50 will break in an emergency situation when the camera mounting mechanism 20 cannot be raised to its retracted position, for example because the motor driven actuator mechanism 27 fails to operate for one reason or another thereby protecting the camera and linkage system S and $S_1$ from damage and at the same time ensuring landing safety of the helicopter. This provides safer landing conditions.

Figure 8:
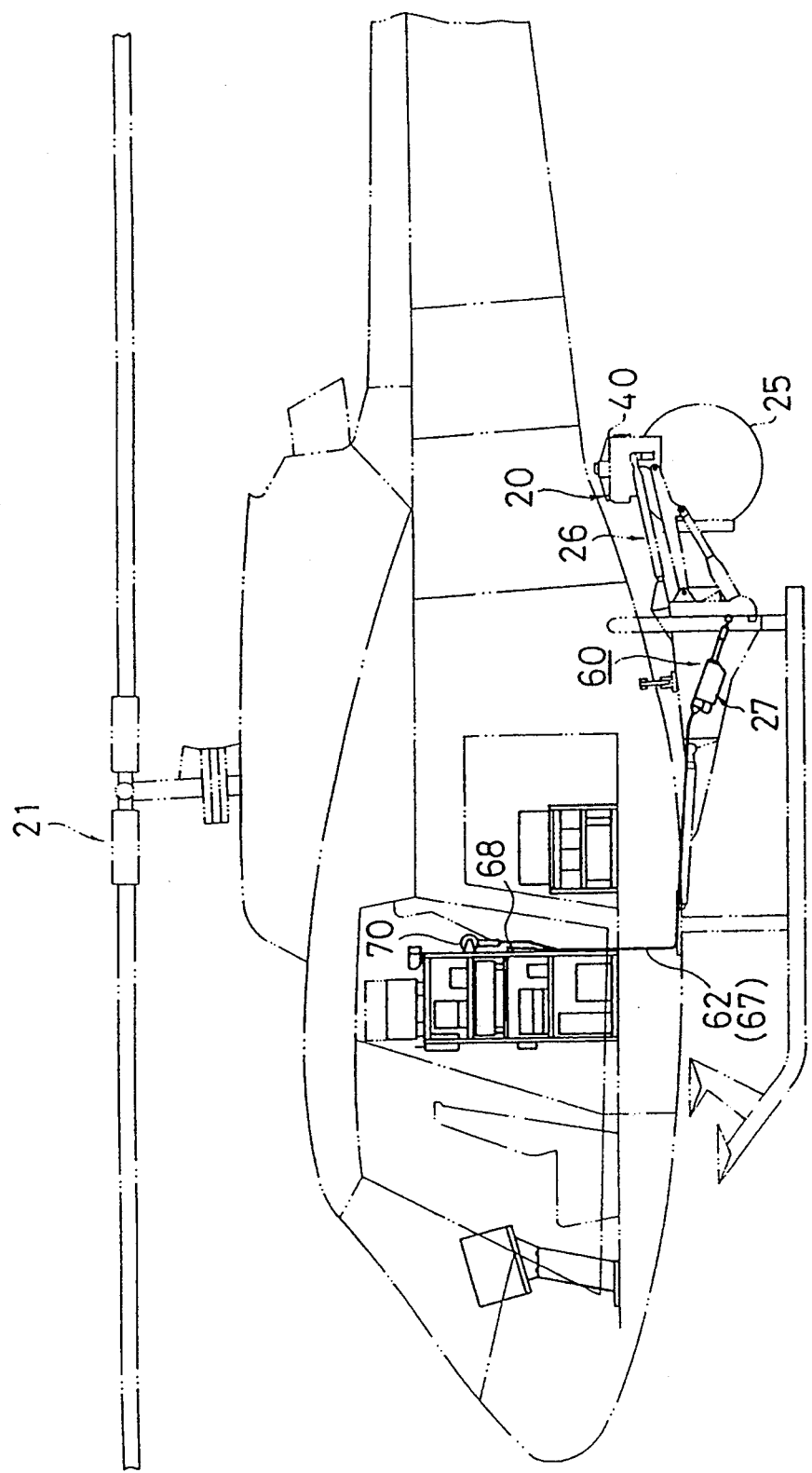
FIG. 8 is side elevational view of a helicopter and camera mounting apparatus similar to FIG. 6 and showing a manual elevating system for the camera mounting apparatus.
Figure 9:
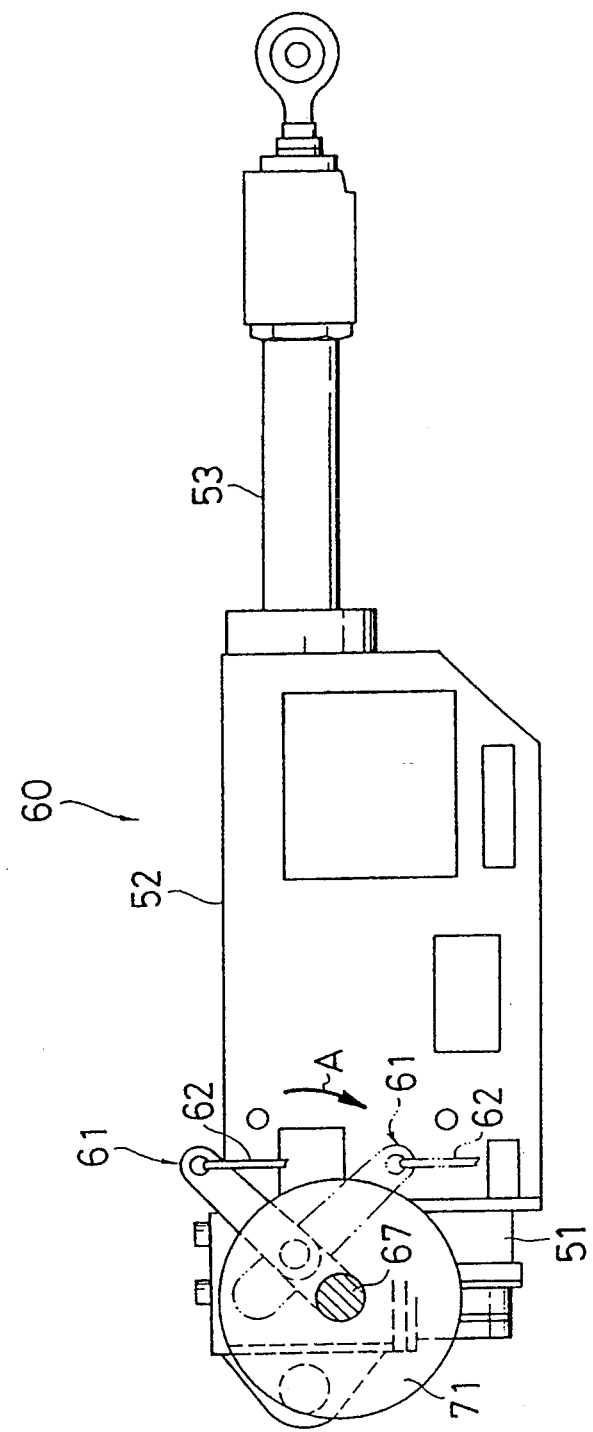
FIG. 9 is an enlarged view of the motor driven actuator equipped with a camera mounting apparatus manual elevating means.
Figure 10:
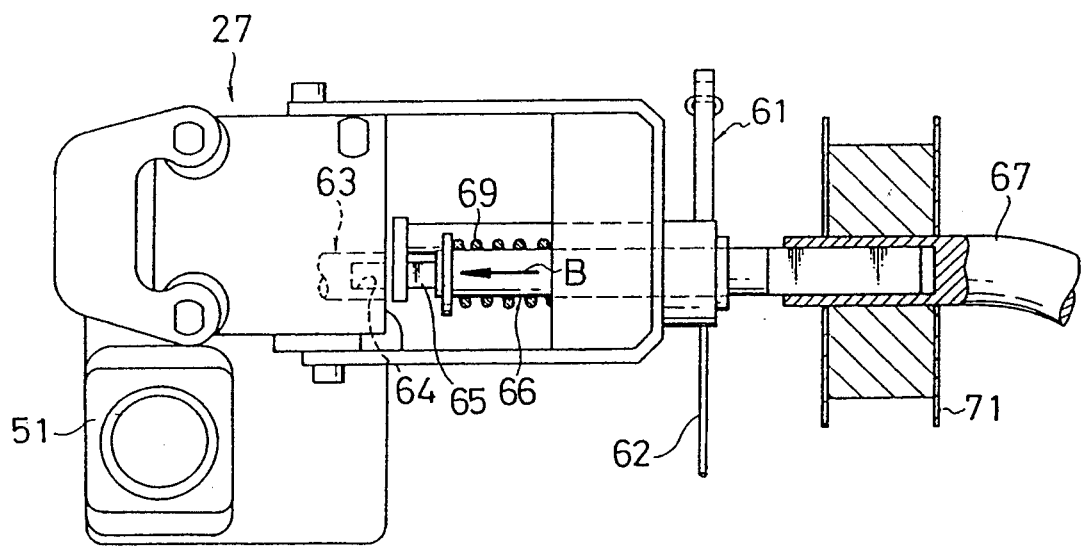
FIG. 10 is a left hand side view of the actuator shown in FIG. 9.
Figure 11:
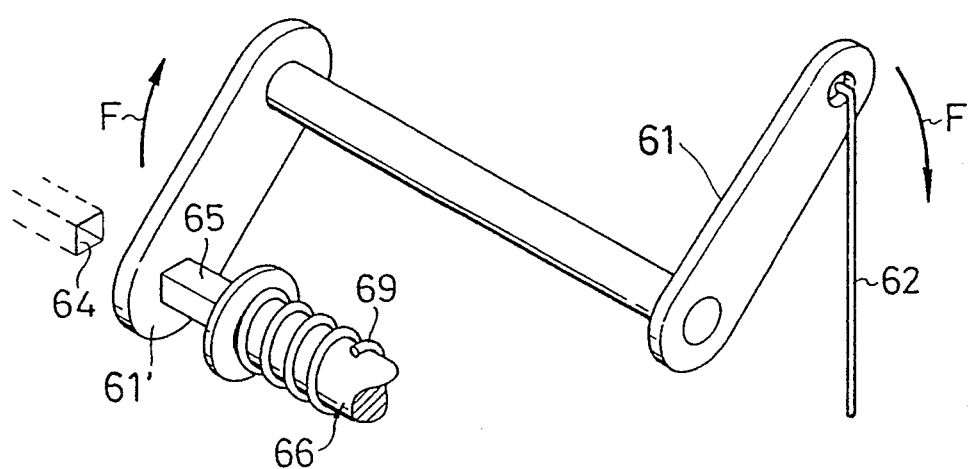
FIG. 11 is a schematic perspective view of a portion of the camera manual elevating means.

The mounting mechanism 20 is also provided with means for manually cycling the camera housing 25 between limit positions in place of the motor driven actuator mechanism 27 in the event that this mechanism becomes inoperable for one reason or another. (See FIGS. 8, 10 and 11). To this end, the manual system generally designated by the numeral 60 comprises a change-over lever 61 operatively connected to the motor driven actuator mechanism 27 in the manner shown in FIG. 9, and a wire actuator 62 for turning the manual change-over lever 61 in the direction of the arrow A and a manual rotating shaft 63 mounted on the motor driven actuator mechanism 27 as shown in FIG. 10. The rotating shaft 63 has at its forward end, a hole 64 of predetermined cross section, in the present instance, square, to receive an operating shaft 66 which is constantly pressed in the direction of arrow B in FIG. 10 on the motor driven actuator mechanism 27 and a flexible tube 67 housing the operating shaft 66 which slides into and out of the flexible tube 67.

The manual camera apparatus elevating system 60 functions as follows. If the motor driven actuator mechanism 27 becomes inoperable, the operator simply pulls lever 68 to position the manual change-over lever 61 from its full line position to a position indicated by an imaginary line in FIG. 9 or in the direction in the arrow F in FIG. 11 via the wire 62. Then, the operating shaft 66 which is normally biased from moving outwardly by a stopper 61' is urged outwardly by spring 69 to engage square shaft 65 into its complementary square hole or opening 64. In this position, a manual control handle 70 is rotated and the turning force of the handle is transmitted to the operating shaft 66 through flexible cable 67 producing turning of the manual rotating shaft 63 to actuate the operating lever 53 of the motor driven actuator mechanism 27 in a direction to raise the camera housing 25 to a retracted position.

The flexible tube 67 is fitted with a handle 71 (see FIGS. 9 and 10) so that the flexible shaft 67 may be rotated from the ground.

Figure 12:
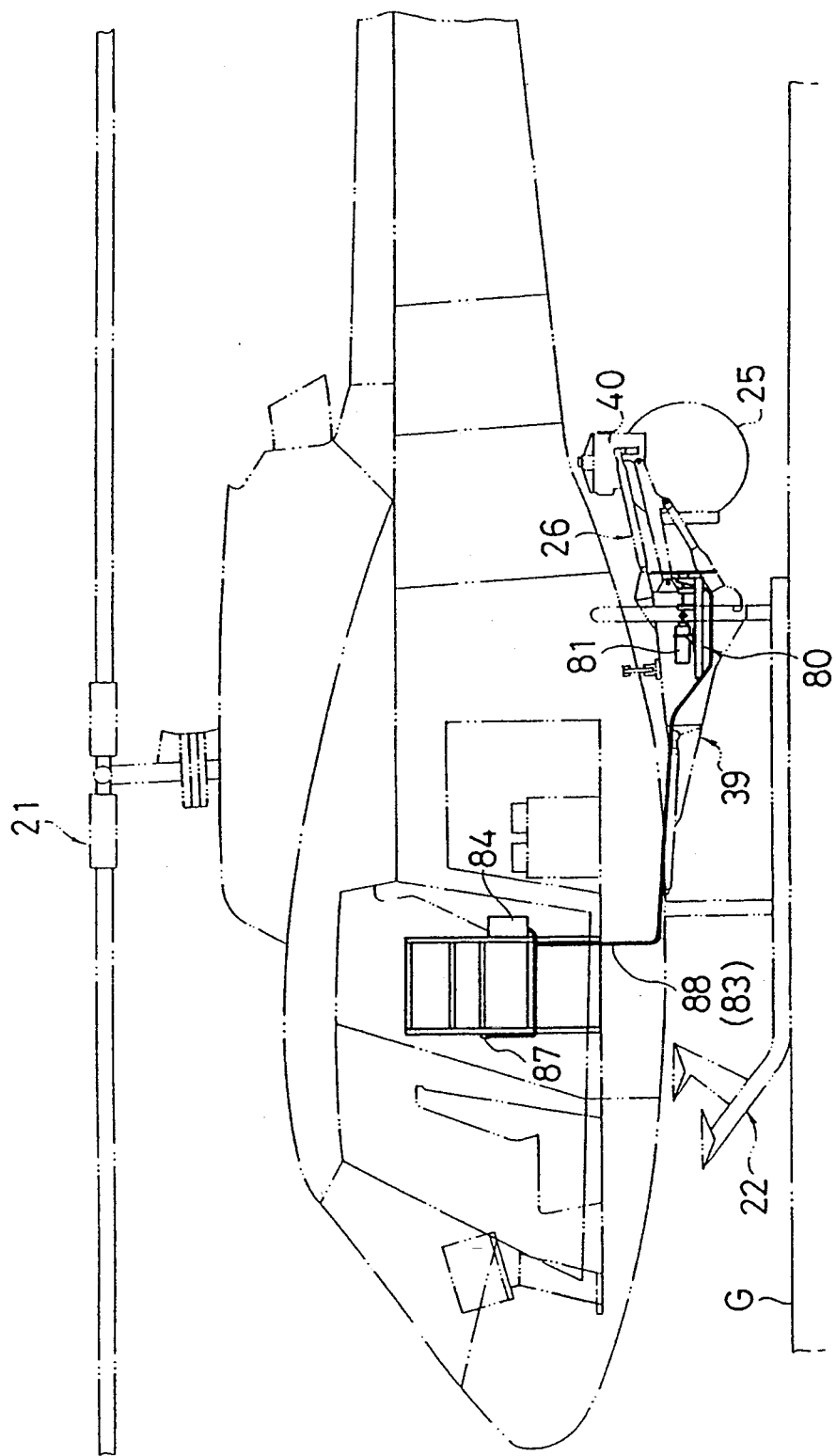
FIG. 12 is a side elevational view of a helicopter with camera mounting means equipped with a lens cleaning system.
Figure 13:
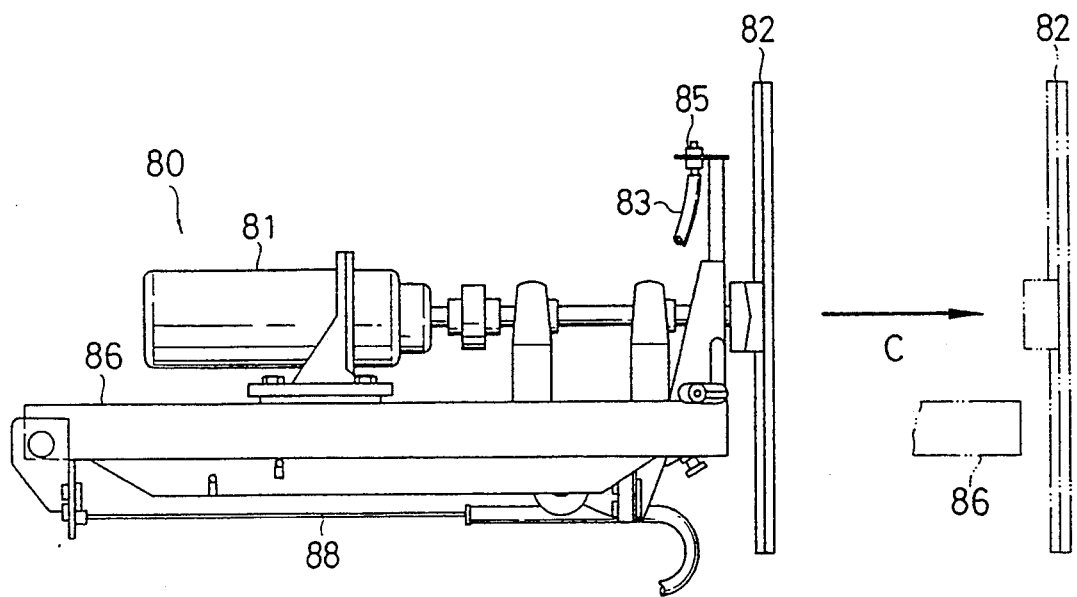
FIG. 13 is a side elevational view of the lens cleaning system.

In accordance with another feature of the present invention, glass cleaning means are provided, generally designated by the numeral 80, which is mounted on the rack 24. The details and arrangement of the glass cleaning means 80 is best illustrated in FIGS. 2, 12 and 13. The glass cleaning system includes a reservoir tank 84 having a built-in pump (not shown), having a nozzle 85 to discharge a jet of cleaning fluid toward the glass of the camera housing. The glass cleaning system further includes a wiper 82 driven by a motor 81 mounted on a base 86 which slides on the rack 24 (see FIG. 13).

Considering now briefly the operation of the glass cleaning system and with particular reference to FIG. 12, with the camera housing 25 in a raised position, an operator simply pulls the lever 87 to displace the wiper 82 in the direction of the arrow C in FIG. 13 to a position where it contacts the glass of the camera housing 25. The operator then actuates the wiper pump switch 89 in the cabin of the helicopter to activate the pump in the cleaning tank 84. This produces a jet of cleaning solution from the nozzle 85 and simultaneously activates the motor 81 to rotate the wiper and thereby remove any dirt and foreign matter such as dust and insects from the glass of the camera housing 25.

Having now described the details and arrangement of the present invention, the next section will explain the operation of the aerocamera mounting mechanism 20. When the helicopter is on the ground, the operating lever 53 of the motor driven actuator mechanism 27 is in a position normally protruding out of the case or housing 52 thereby tilting the bell crank 31 in the direction of the arrow D in FIG. 1. In this position, the parallel links 37 and 38 of the linkage system S and $S_1$ are positioned to support the camera mounting housing 25 in the raised or retracted position shown in FIG. 12. Accordingly, the camera mounting apparatus is spaced upwardly from the ground surface G and the plane P—P of the helicopter skids. This elevated position of the camera elevating mechanism 25 is determined by rotating the bell crank 31 until it contacts the stop 35.

And thus, as illustrated in FIG. 1, the forward end 47 of the bell crank 31 is in a position where the bell crank has turned in the direction of the arrow D from a line L—L connecting a pin 48 at the center of rotation of the bell crank 31 with a pin 49 for connecting the connecting link 33 to link 38 of the parallel links 37 and 38. Thus, the forward end 47 of the bell crank 31 is over center to prevent the application of excessive load resulting from a landing shock of the helicopter to the motor driven actuator mechanism 27 and also to lock the parallel links 37 and 38 in the upper retracted attitude or position.

During the flight of the helicopter 21, a switch 90 (see FIGS. 6 and 7) in the cabin is operated to withdraw the operating lever 53 of the motor-driven actuator 27 into the case or housing 52, tilting the bell cranks 31 and 32 in the direction of the arrow E in FIG. 1 and facing the parallel links 37 and 38 down to move the camera housing 25 downward from the bottom end of the landing gear skid 22. At this time, the camera housing 25 is moved downward by means of the parallel links 37 and 38. The downward position of the camera housing 25 is determined by holding the bell crank 31 in contact with the stop 36. In this position, it is possible to perform 360° aerial photography without the landing gear skid 22 coming within the field of view of the camera.

With the camera housing 25 located on the center line of the helicopter 21, the helicopter 21 is in a well-balanced condition unlike the conventional apparatus wherein the camera is mounted on one side of the helicopter, thereby facilitating better control of the helicopter 21 and enabling the flight of the helicopter at speeds of about 240 km/h.

Dust and insects accumulating on the glass section of the camera housing 25 and affecting photography during flight can be removed by means of the glass cleaning means 80 with the camera housing 25 in a raised or retracted position by the motor driven actuator 27.

When the helicopter 21 is landing, the switch 90 (see FIGS. 6 and 7) in the cabin is operated to protrude the operating lever 53 of the motor-driven actuator 27 out of the case 52, actuating the parallel links 37 and 38 upwardly and raising the camera housing 25 from the bottom end of the landing gear skid 22 to a raised position.

If the motor-driven actuator 27 fails to operate to move the operating lever 53 out of the case 52, the lever 68 (see FIG. 8) of the manual camera apparatus elevating means 60 is pulled to move the square shaft 65 of the operating shaft 66 into the square hole 64 of the manual rotating shaft 63 by means of the wire 62, thus turning the manual operating handle 70. Thus the operating lever 53 is manually moved out of the case 52, raising the camera housing 25. Therefore the helicopter 21 can land safely since the camera housing 25 is spaced above the landing skids and cannot contact ground G.

Furthermore, if the camera housing 25 cannot be raised by the manual elevating means 60, the helicopter 21 gradually descends with the camera housing 25 left in a lowered extended state, pushing the camera housing 25 against the landing ground G to cut the shear bolt 50 through the parallel links 37 and 38, the connecting link 33 and the bell crank 31. After the camera housing 25 is thus raised, the helicopter 21 will land on the ground. The shear bolt 50 (see FIG. 4) will be broken at the grooves 54, 54. The helicopter 21 can therefore land on the ground without causing extensive damage to the camera housing 25.

Even though the present invention has been illustrated and described herein in connection with a helicopter, it is to be understood that the apparatus and principle may be used on other aircraft such as Cessna planes or the like.

Summarizing the features of the present invention, it can be seen that the camera mounting mechanism or apparatus of the present invention is characterized by novel features of construction and arrangement which during aerial photography permits easy and quick positioning of the camera below the plane P—P of the landing gear skids and therefore it is possible to perform omni-directional photography below this plane without the landing gear skid entering the field of view of the camera. Moreover, after completing the photography, the camera can be easily and quickly raised to a retracted position ensuring trouble-free landing of the aircraft. The invention further provides a relatively simple and effective system for maintaining the glass clean and thereby ensuring sharp photography. Additionally, the manual control means provides an effective back up for moving the camera between extended and retracted positions manually and enabling safe operation in the event of trouble developing in the automatic system described above. Additionally, the shear pin in the system provides a fail safe system ensuring that there is no interference from the camera during landing if both systems should lock with the camera in an extended position below the plane P—P of the skids. The shear pin ensures breakage of a weak link in the linkage system by a comparatively small landing force.

Even though particular embodiments of the present invention have been illustrated and described herein, it is not intended to limit the invention and changes and modifications may be made therein within the scope of the following claims.

What is claimed is:

1. A camera mounting mechanism as claimed in claim 1 wherein said actuator means is motor driven.

2. A camera mounting mechanism as claimed in claim 1 wherein said actuator means is manually operable.

3. A camera mounting mechanism as claimed in claim 1 wherein said linkage system includes a shear pin permitting displacement of the linkage system from the extended limit position when a predetermined force is exerted on the camera support section or camera housing.

4. A camera mounting mechanism as claimed in claim 1 wherein said extended limit position moves the camera below a plane of the landing skids of a helicopter thereby permitting 360° photography from a single camera.

5. Camera mounting mechanism for aircraft comprising:
   a) housing for a camera;
   b) a camera support section including a linkage system for movement of said camera housing between a retracted limit position proximate the aircraft and an extended limit position facilitating 360° photography;
   c) actuator means for selectively actuating said camera support section between said limit positions; and
   d) means for cleaning a glass section of said camera housing, including a reservoir tank having nozzle discharge means to direct a jet of cleaning fluid toward the glass section of said camera housing and a motor driven wiper which is mounted for sliding movement on said camera support section.

6. Camera mounting mechanism for aircraft comprising:
   a) housing for a camera;
   b) a camera support section including a linkage system for movement of said camera housing between a retracted limit position proximate the aircraft and an extended limit position facilitating 360° photography;
   c) actuator means for selectively actuating said camera support section between said limit positions;
   d) motor-driven and manual actuator means; and
   e) said manual actuator means including a change-over lever operatively connected to the motor-driven actuator means to urge an operating shaft connected through a flexible cable to an operating lever of the motor driven actuator means whereby the turning force transmitted moves the camera housing to its retracted limit position.

7. Camera mounting mechanism for aircraft comprising:
   a) housing for a camera;
   b) a camera support section including a linkage system for movement of said camera housing between a retracted limit position proximate the aircraft and an extended limit position facilitating 360° photography while aircraft is spatially oriented in one position; and c) actuator means for selectively actuating said camera support section between said limit positions.

8. The camera mounting mechanism of claim 7, wherein the actuator means is operated manually.

9. The camera mounting mechanism of claim 7, wherein the actuator means is motor-driven.

10. The camera mounting mechanism of claim 7, wherein the actuator means is operated manually and by a motor.

11. Camera mounting mechanism for aircraft comprising:

a) housing for a camera;

b) a camera support section located substantially next to the aircraft's center of gravity, including a linkage system for movement of said camera housing between a retracted limit position proximate the aircraft and an extended limit position facilitating 360° photography while aircraft is spatially oriented in one position; and c) motor-driven and manual actuator means for selectively actuating said camera support section between said limit positions.

* * * * *

UNITED STATES PATENT AND TRADEMARK OFFICE
CERTIFICATE OF CORRECTION

PATENT NO.    : 5,365,291
DATED         : November 15, 1994
INVENTOR(S)   : Iwao Maeda It is certified that error appears in the above-identified patent and that said Letters Patent is hereby corrected as shown below:

Column 6, line 14,   claim "1" should read --claim 2--.

line 16,   claim "2" should read --claim 3--.

line 18,   claim "3" should read --claim 4--.

line 24,   claim "4" should read --claim 5--.

line 29,   claim "5" should read --claim 1--.

Signed and Sealed this

Third Day of September, 1996

Attest:

BRUCE LEHMAN

*Attesting Officer*             *Commissioner of Patents and Trademarks*